United States Patent [19]

Horiguchi

[11] Patent Number: 5,672,139
[45] Date of Patent: Sep. 30, 1997

[54] DRIVE FORCE CONTROLLER FOR AN AUTOMATIC TRANSMISSION

[75] Inventor: Masanobu Horiguchi, Kanagawa-ken, Japan

[73] Assignee: Unisia Jecs Corporation, Kanagawa-ken, Japan

[21] Appl. No.: 519,284

[22] Filed: Aug. 25, 1995

[51] Int. Cl.$^6$ ............................................. F16H 59/48
[52] U.S. Cl. .......................... 477/120; 477/121; 477/902
[58] Field of Search ........................ 477/120, 121, 477/143, 902

[56] References Cited

U.S. PATENT DOCUMENTS

| | | | |
|---|---|---|---|
| 5,231,582 | 7/1993 | Takahashi et al. | 477/120 X |
| 5,231,897 | 8/1993 | Morita | 477/120 |
| 5,241,476 | 8/1993 | Benford et al. | 477/120 X |
| 5,272,939 | 12/1993 | Markyvech et al. | 477/120 |
| 5,319,555 | 6/1994 | Iwaki et al. | 477/120 X |
| 5,425,689 | 6/1995 | Genise | 477/120 |

FOREIGN PATENT DOCUMENTS 63-167158  7/1988  Japan.
1-55346  11/1989  Japan.

*Primary Examiner*—Khoi Q. Ta
*Attorney, Agent, or Firm*—Lowe, Price, LeBlanc & Becker

[57] ABSTRACT

The present invention provides for a rapid down-shift to meet an insufficient drive force due to an increase in running resistance such as when ascending a slope. Speed change control is carried out by selecting a speed change step based on the vehicle speed and throttle opening. When there is no speed change requirement, the current running resistance is computed, and the maximum drive force for the current speed change step computed. The maximum drive force is computed based on the down-shift throttle opening corresponding to the current vehicle speed on a down-shift line from the current speed change step to a speed change step on a lower speed side. The running resistance and maximum drive force are compared, and when the maximum drive force is less than the running resistance a forceful down-shift is made.

7 Claims, 9 Drawing Sheets

DRIVE FORCE CONTROLLER FOR AN AUTOMATIC TRANSMISSION

FIELD OF THE INVENTION

The present invention relates to a speed change controller for a vehicle automatic transmission.

DESCRIPTION OF THE RELATED ART

With controls which determine a speed change step from a shift pattern map, in accordance with vehicle speed and engine load (for example throttle opening), controls for preventing shift hunting at the time of ascending a slope have heretofore been disclosed in Japanese Examined Patent Publication No. 1-55346 and Japanese Unexamined Patent Publication No. 63-167158.

These controls are characterized in that at the time of an up-shift demand, the current running resistance and an estimated drive force for after up-shift (the drive force for the next speed change step) are compared, and when the drive force is less than the running resistance, up-shift is prevented.

However, the controls disclosed in the abovementioned publications, are for preventing speed change to a speed change step where the drive force is less than the running resistance. Therefore speed change to a speed change step on a lower speed side to meet an insufficient drive force in the current speed change step due to an increase in running resistance is not carried out until the throttle opening resulting from pressing the accelerator pedal exceeds a predetermined throttle opening set on the down-shift line. A sensation of insufficient drive force thus continues over this period.

More specifically, with reference to FIG. 9, with the present conditions at point A on an up-shift line at speed 4, then when the running resistance at this time increases, to meet the increase in running resistance, the accelerator pedal is pressed to increase the throttle valve opening from the current $TVO_0$ to maintain the drive force (equivalent to vehicle speed). However, at the current speed 4, even if the throttle opening becomes the predetermined throttle opening $TVO_1$ on the down-shift line from speed 4 to speed 3, when a drive force greater than the current running resistance cannot be obtained, then a down-shift to speed 3 occurs when the throttle opening resulting from pressing of the accelerator pedal attains this predetermined throttle opening $TVO_1$ (point B). A sensation of insufficient drive force thus continues from point A until point B.

The present invention takes into consideration the above situation with the conventional arrangement, with the object of effecting a rapid speed change to a speed change step on the lower speed side when the drive force in the current speed change step is insufficient due to an increase in running resistance resulting for example from ascending a slope, to thereby improve drivability.

SUMMARY OF THE INVENTION

Accordingly with the present invention, a control apparatus for an automatic transmission for controlling speed change by referring to a shift pattern map on the basis of vehicle speed and engine load to select a speed change step comprises: a running resistance computing device for computing current running resistance, a maximum drive force computing device for computing maximum drive force for a current speed change step, a comparison device for comparing the running resistance and the maximum drive force, and a device for effecting speed change from a current speed change step to a speed change step on a lower speed side according to results of the comparison, when the maximum drive force is less than the running resistance.

More specifically, a current running resistance and a maximum drive force for the current speed change step are compared, and when the maximum drive force for the current speed change step is less than the current running resistance, speed change is effected from the current speed change step to a speed change step on a lower speed side (down-shift). As a result, when the drive force is insufficient for the current speed change step, this is met with a rapid down-shift, with minimum sensation of insufficient drive force, so that drivability is improved.

Here the maximum drive force computing device may compute the maximum drive force for the current speed change step based on an engine load corresponding to the current vehicle speed on a down-shift line in the shift pattern map from a current speed change step to a speed change step on a lower speed side. As a result, the maximum drive force for the current speed change step can be accurately estimated.

Moreover, the comparison device may make a comparison after first adding or subtracting a predetermined threshold value to one of the maximum drive force and the running resistance.

If in this way, comparison of the maximum drive force and the running resistance is made after first adding or subtracting a predetermined threshold value to one of the maximum drive force and the running resistance, then the comparison can be made with a suitable surplus. A more practical comparison can thus be made, for example with maintenance of the drive force having priority, or prevention of overrun of the engine having priority.

In this case, a threshold value adjustment device may be provided for changing the threshold value in accordance with vehicle operating conditions, more specifically vehicle speed or a speed change step.

In this way, the surplus amount may be made dependent on the operating conditions (vehicle speed or speed change step).

The device for effecting speed change to a speed change step on a lower speed side, may involve a forceful down-shift device which forcefully speed changes to the speed change step on the lower speed side, and may involve a down-shift line transfer device for transferring a down-shift line in the shift pattern map from a current speed change step to a speed change step on the lower speed side, to a high vehicle speed side or to a low load side.

Characteristic constructions of the present invention and operations and effects based on these, will become more apparent from the following embodiments described hereunder.

DETAILED DESCRIPTION OF THE PREFERRED EMBODIMENTS

Figure 1:
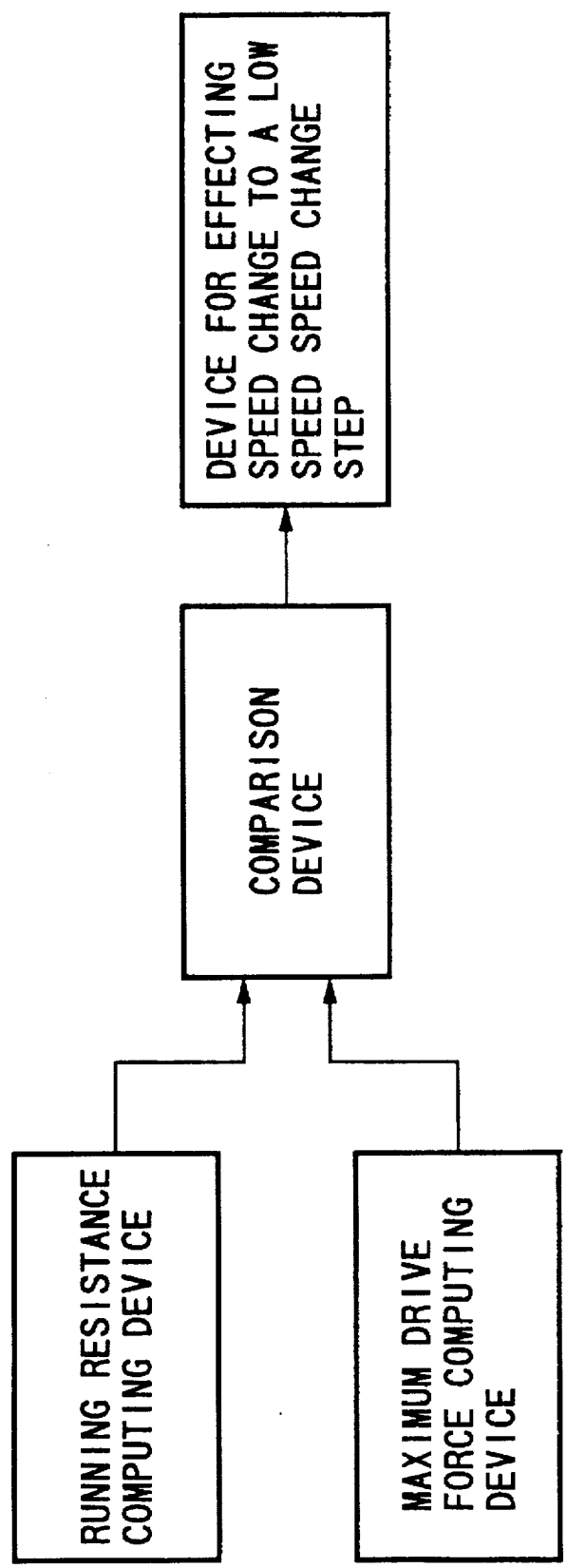
FIG. 1 is a block diagram illustrating a basic functional arrangement according to the present invention.

A basic construction of a controller for an automatic speed changer according to the present invention is shown in FIG. 1, while embodiments thereof are described below with reference to FIGS. 2 through 8.

Figure 2:
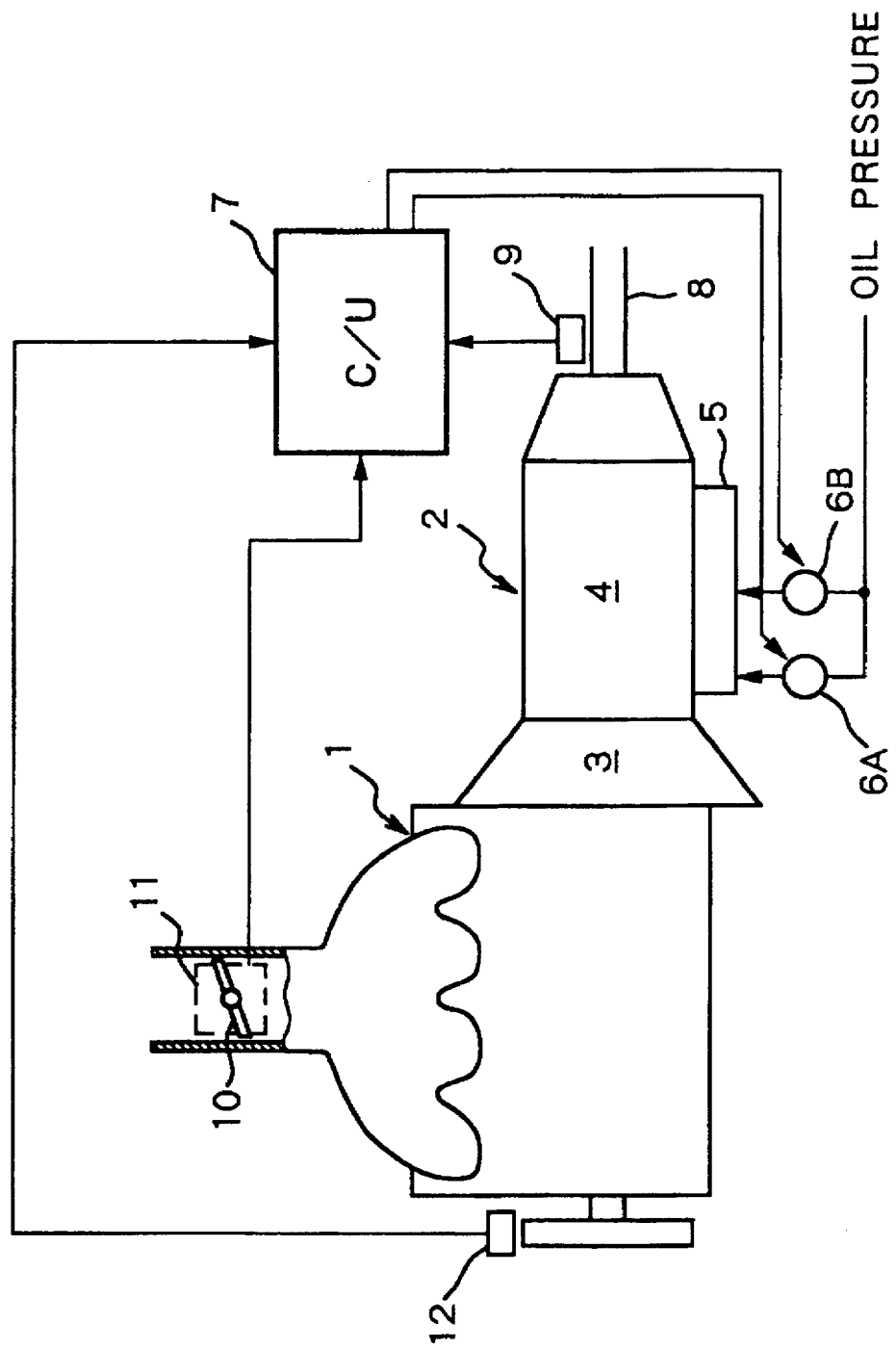
FIG. 2 is a schematic diagram illustrating an embodiment of the present invention.

FIG. 2 is a schematic diagram of an embodiment of the present invention.

In FIG. 2, a vehicle engine 1 has an automatic transmission 2 provided on an output side thereof. The automatic transmission 2 comprises a torque converter 3, a gear type speed changer 4 connected to the engine output by way of the torque converter 3, and a hydraulic actuator 5 whereby various speed change gears in the gear type speed changer 4 may be engaged and disengaged. The operating pressure for the hydraulic actuator 5 may be turned on an off by means of various solenoid valves. In the present case however, only shift solenoid valves 6A, 6B, for the automatic transmission shift are shown.

Signals from various sensors are input to a control unit 7.

For the various sensors there is provided a vehicle speed sensor 9 for detecting the vehicle speed VSP (output shaft rpm) on the basis of a rotation signal from an output shaft 8 of the automatic transmission 2.

Moreover, a potentiometer type throttle valve sensor 11 is provided for sensing the opening (TVO) of a throttle valve 10 in the air intake system of the engine 1.

Furthermore, a crank angle sensor 12 is provided either adjacent to the crank shaft of the engine 1 or adjacent a shaft rotating at the same speed as the crank shaft. Engine rotational speed Ne is computed from the period of signals from the crank angle sensor 12. For example from the period of pulse signals per reference crank angle.

A microcomputer (incorporated in the control unit 7) automatically sets a speed change step from speed 1 to speed 4 according to a speed change control routine described later, and controls on/off combinations of the shift solenoid valves 6A, 6B, to control the gear type speed changer 4 to the speed change step, by means of the hydraulic actuator 5.

Figure 3:
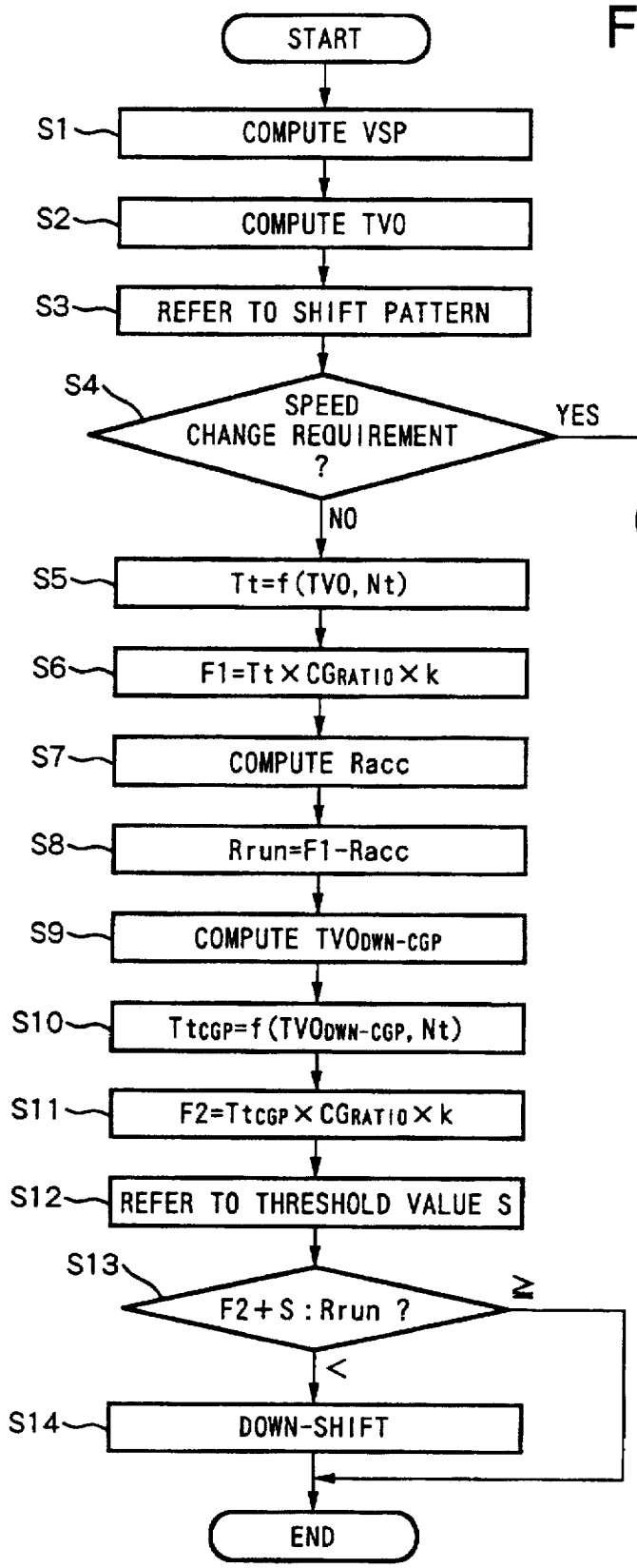
FIG. 3 is a flow chart for a preliminary part of a speed change control routine.
Figure 4:
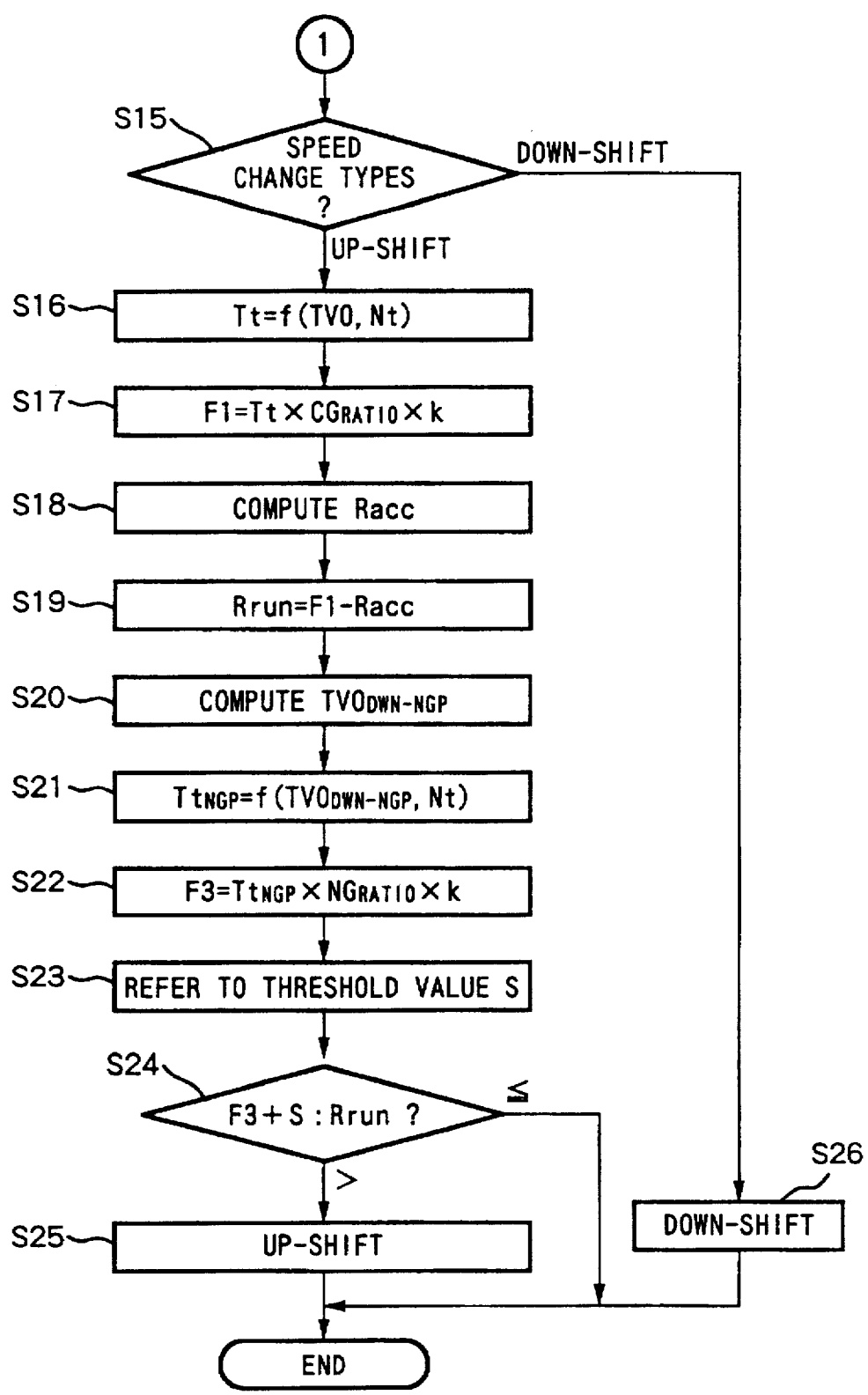
FIG. 4 is a flow chart for a subsequent part of the speed change control routine.

The speed change control routine will now be explained with reference to FIGS. 3 and 4. This routine is carried out at predetermined intervals.

In step 1 (with step indicated by S in the figures), the vehicle speed VSP is computed based on signals from the vehicle speed sensor 9.

Then in step 2, the throttle opening TVO (engine load) is computed based on signal from the throttle sensor 11.

Figure 5:
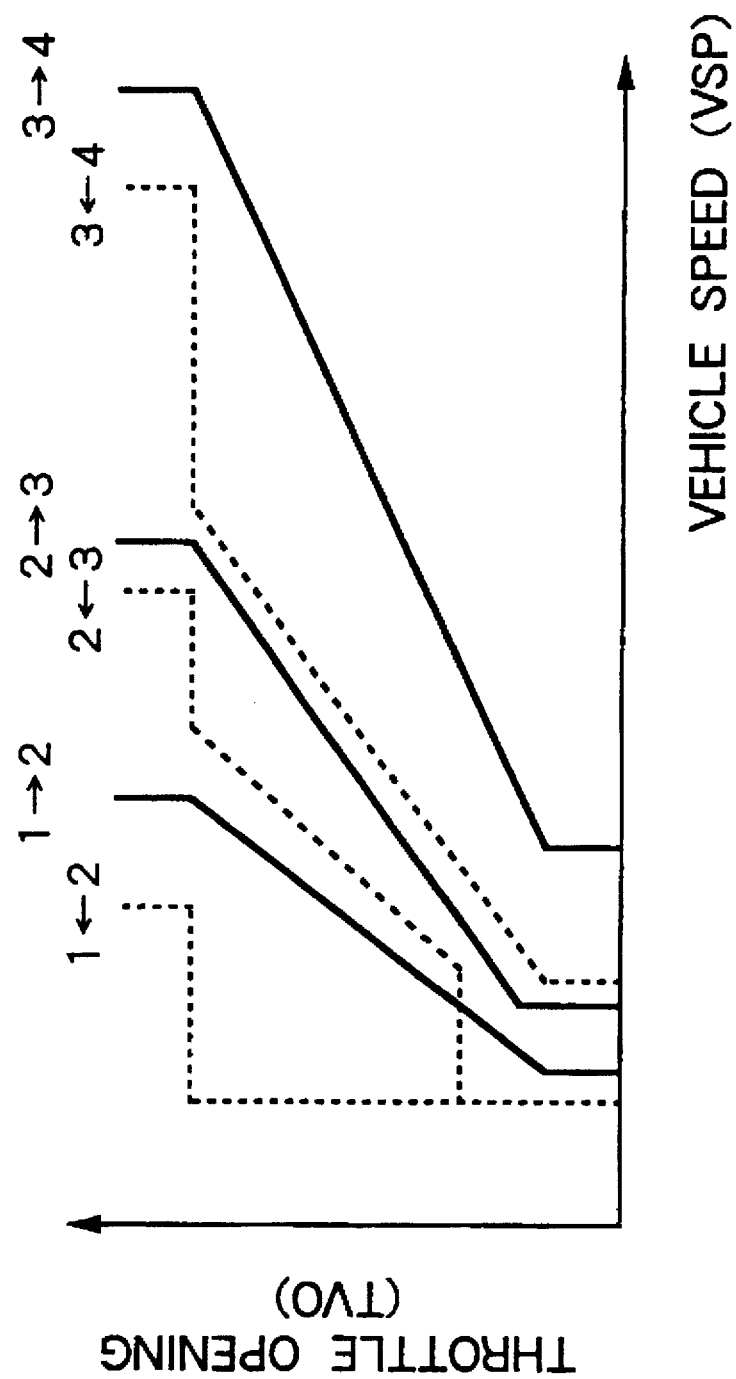
FIG. 5 is a map showing shift pattern lines.

In step 3, a shift pattern map as shown in FIG. 5, in which speed change steps are determined in accordance with the vehicle speed VSP and the throttle opening TVO, is referred to, and a speed change step selected. With the shift pattern map in FIG. 5, the full line represents an up-shift line while the broken line represents a down-shift line.

In step 4, the selected speed change step and the current speed change step are compared, and it is judged whether or not there is a speed change requirement (an up-shift or a down-shift requirement).

In the case of no speed change requirement, control proceeds to step 5, while in the case of a speed change requirement, control proceeds to step 15. [In the case of no speed change requirement]

Figure 6:
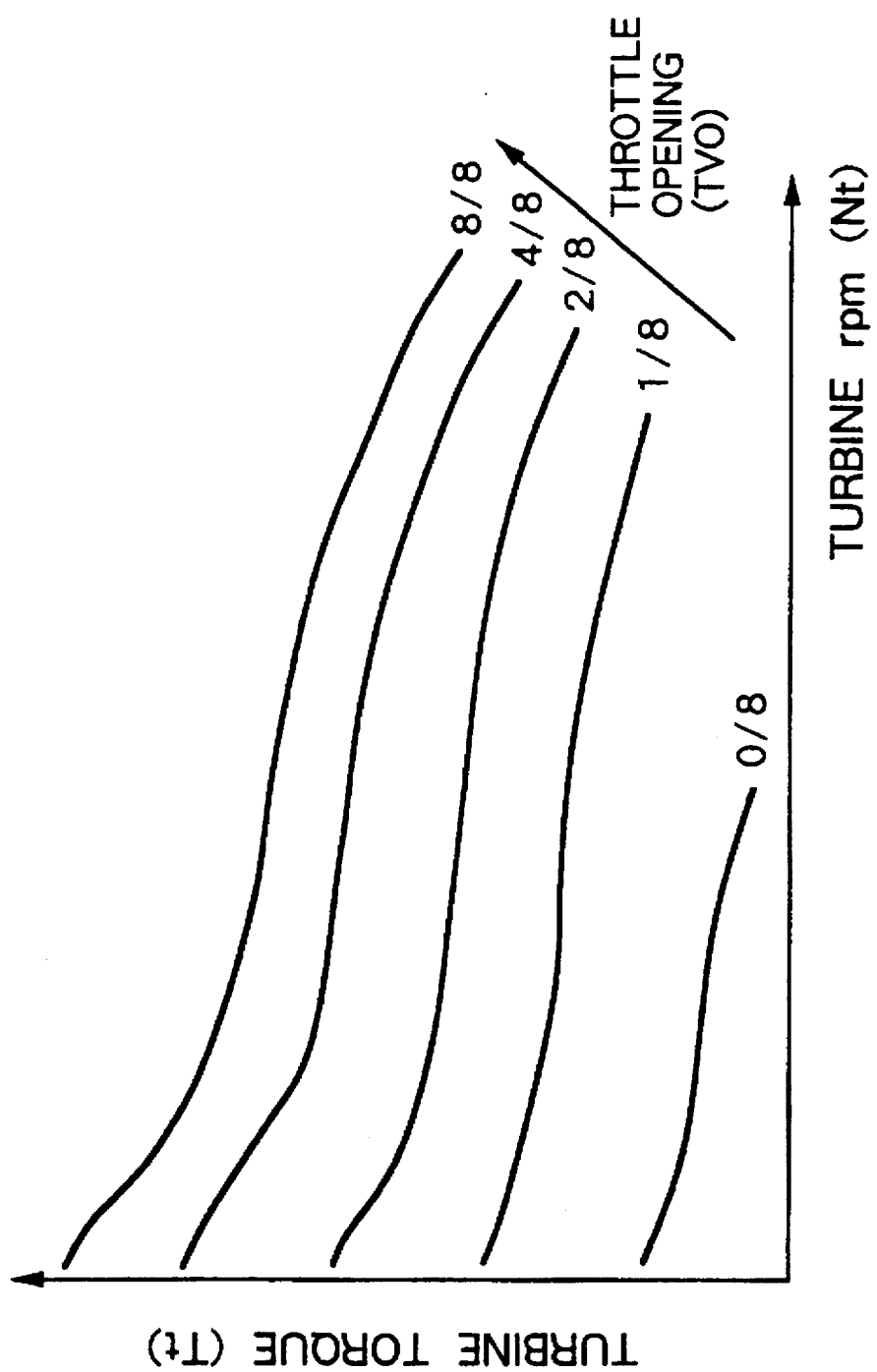
FIG. 6 shows a map for computing turbine torque.

In step 5, the map shown in FIG. 6 is referred to, and the turbine torque Tt computed based on the current throttle opening TVO and the turbine rotational speed Nt. The turbine rotational speed Nt is computed from the vehicle speed VSP (output shaft rpm) and the gear $CG_{RATIO}$ for the current speed change step (for example speed 4).

In step 6, the current drive force F1 is computed based on the computed turbine torque Tt according to the following equation;

$$F1 = Tt \times CG_{RATIO} \times k$$

where $CG_{RATIO}$ is the gear ratio for the current speed change step (for example speed 4) and k is a constant determined for example by the turbine radius.

In step 7, the acceleration resistance Racc is computed according to the following equation;

$$Racc = \Delta VSP \times W \times K$$

where $\Delta VSP$ is the change in vehicle speed, W is the vehicle weight, and K is a constant.

In step B, the running resistance Rrun is computed by subtracting the acceleration resistance Racc from the current drive force F1 according to the following equation;

$$Rrun = F1 - Racc$$

Here the parts of step 5 through step 6 correspond to the running resistance computing device.

In step 9, the throttle opening TVO corresponding to the current vehicle speed VSP on the down-shift line from the current speed change step (for example speed 4) to a speed change step on a lower speed side (speed 3) in the down-shift map is obtained, and this becomes $TVO_{DWN-CGP}$ (the down-shift throttle opening for the current speed change step).

Figure 7:
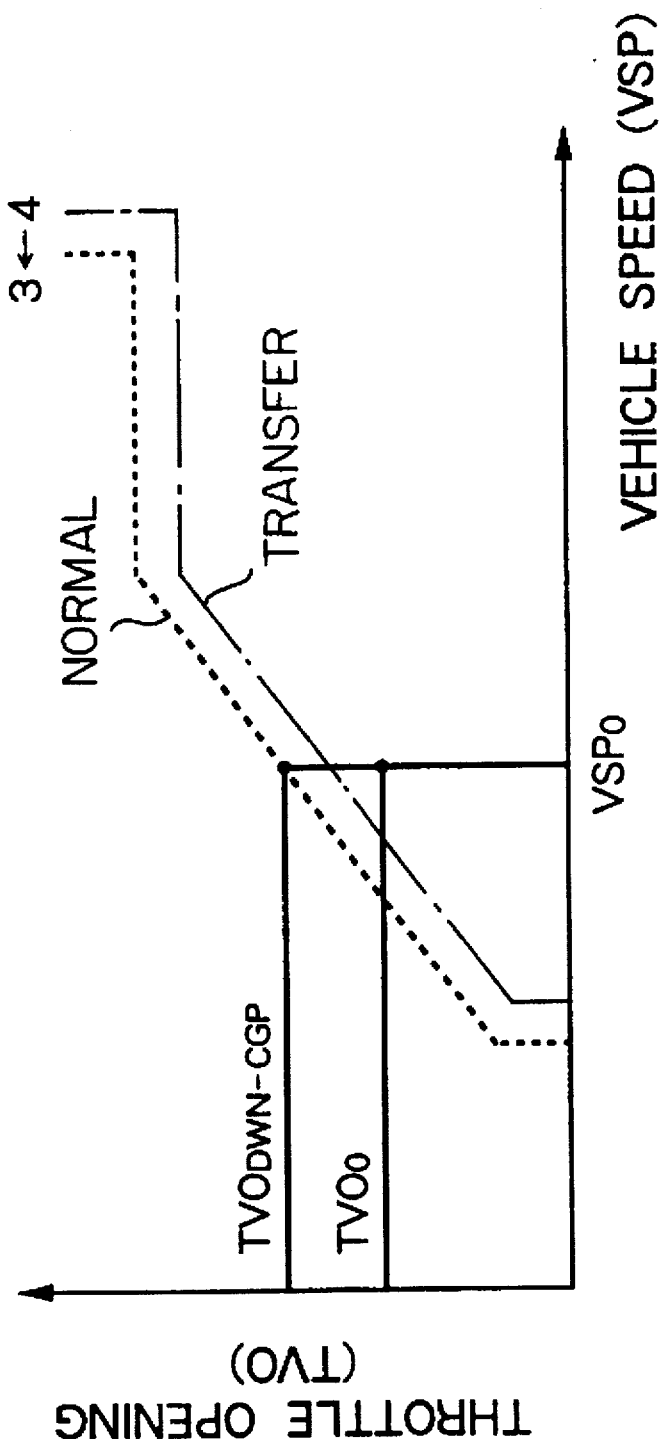
FIG. 7 is a diagram for illustrating a method for computing down-shift throttle opening.

More specifically, with reference to FIG. 7, when the current vehicle speed is $VSP = VSP_0$ with the current speed change step at step 4, a throttle opening $TVO_{DWN-CGP}$ corresponding to the current vehicle speed $VSP_0$ on the down-shift line from speed 4 to speed 3 is obtained. The throttle opening $TVO_0$ in FIG. 7 is the current throttle opening.

In step 10, the map shown in FIG. 6 is referred to, and a turbine torque $Tt_{CGP}$ is computed based on the down-shift throttle valve opening $TVO_{DWN-CGP}$ for the current speed change step (speed 4) and the current turbine rotational speed Nt. This turbine torque $Tt_{CGP}$ is the maximum turbine torque at the current speed change step (speed 4).

In step 11, the maximum drive force F2 is computed for the current speed change step (speed 4) based on the computed turbine torque $Tt_{CGP}$ according to the following equation;

$$F2 = Tt_{CGP} \times CG_{RATIO} \times k$$

where $CG_{RATIO}$ is the gear ratio for the current speed change step (speed 4), and k is a constant determined for example by the turbine radius.

Here the parts of step 9 through step 11 correspond to the maximum drive force computing device.

Figure 8A:
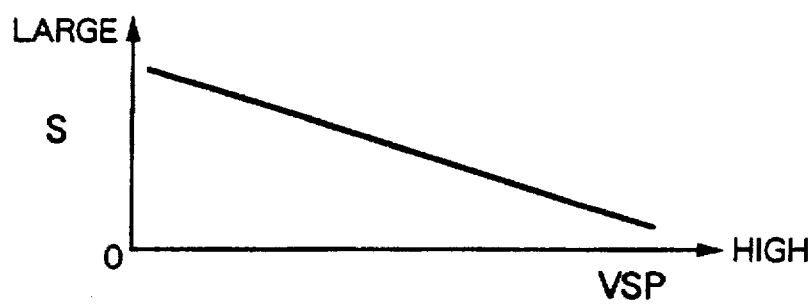
FIG. 8 shows a map for computing a threshold value.
Figure 8B:
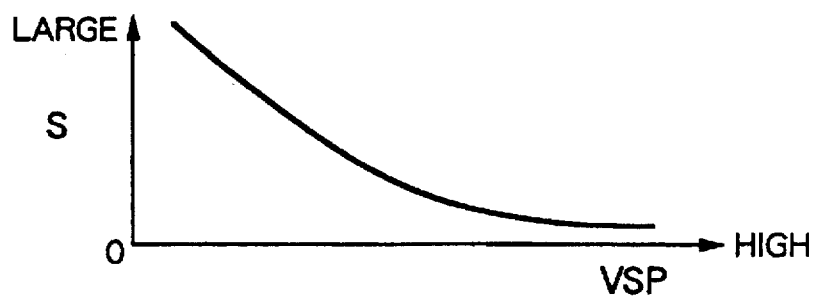
Figure 8C:
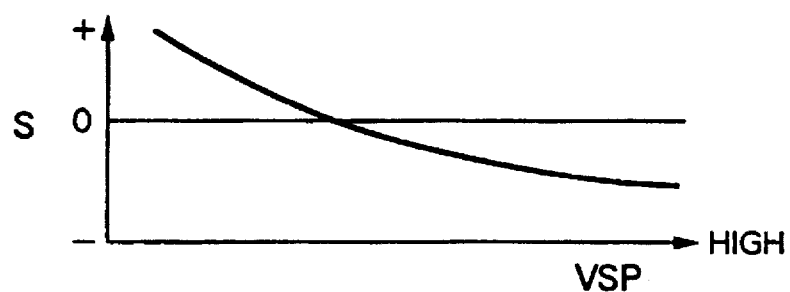
Figure 8D:
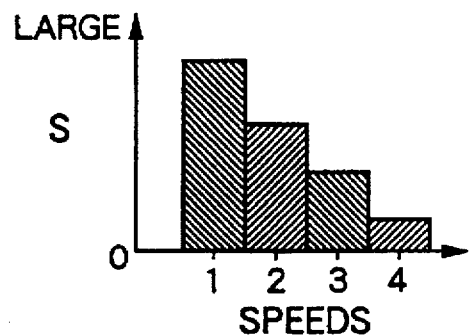
Figure 9:
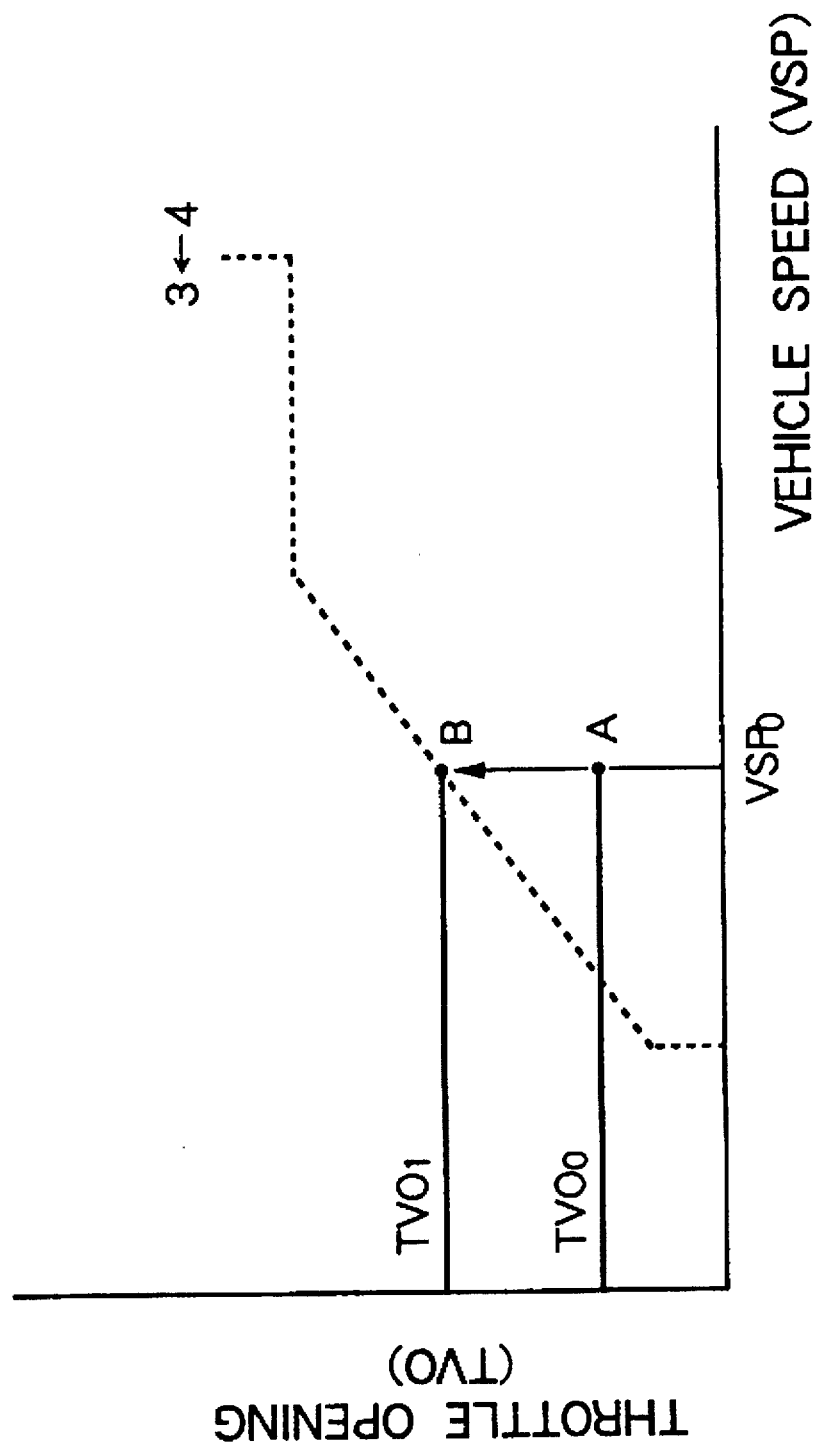
FIG. 9 is a diagram for illustrating a problem with conventional devices.

In step 12 one of the maps shown in FIGS. 8(A), (B), (C) and (D) is referred to, and the threshold value S computed for the vehicle speed VSP or current speed change step.

In step 13, the sum of the maximum drive force F2 for the current speed change step (speed 4) and the threshold value S (F2+S) is compared with the running resistance Rrun.

When the compared result is F2+S≧Rrun, the routine is terminated.

On the other hand when the result is F2+S<Rrun, control proceeds to step 14 where a down-shift requirement signal is output, to thus effect down-shift.

In this way, when the maximum drive force F2 for the current speed change step is less than the running resistance Rrun, then since a down-shift will eventually occur even if the accelerator pedal is pressed, the insufficient drive force is anticipated so that down-shift occurs rapidly.

Here, by comparing the running resistance Rrun after first adding the threshold value S to the maximum drive force F2, then forceful down-shift is suppressed a little so that a surplus can be maintained. The reason for making the threshold value S dependent on the vehicle speed VSP is because, since with a low vehicle speed a larger drive force can be obtained with a smaller throttle opening change, then the surplus threshold value is also desirably larger.

However, in the case where the main object is suppression of overrun of the engine, then the threshold value added to the maximum drive force F2 may be made a minus value so that in effect it is subtracted.

Moreover, a similar effect can be achieved by subtracting or adding the threshold value to the running resistance Rrun.

As vehicle operating conditions parameters for changing the threshold value, other than the vehicle speed VSP and speed change step, the change in vehicle speed ΔVSP, the throttle opening TVO and the change in throttle opening ΔTVO and the like may be used.

Here steps 12 and 13 correspond to the comparison device (of these step 12 corresponds to the threshold value adjustment device), while step 14 corresponds to the device for effecting speed change to a speed change step on the lower speed side (forceful down-shift device).

Now instead of the forceful down-shift, the down-shift line in the shift pattern map from the current speed change step (for example speed 4) to the speed change step on the lower speed side (speed 3) may be transferred to a high vehicle speed side or to a lower throttle opening side for example from the "NORMAL" line shown in FIG. 7 to the "TRANSFER" line also shown in FIG. 7.

In the case of a speed change requirement.

In step 15, it is judged if the speed change requirement is an up-shift requirement or a down-shift requirement.

In the case of a down-shift requirement, control proceeds to step 26 where a down-shift requirement signal is output, to thus effect down-shift.

In the case of a up-shift requirement (for example from speed 3 to speed 4) control proceeds to step 16 in order to judge aptitude for up-shift.

In step 16, the map of FIG. 6 is looked up, and the turbine torque Tt computed based on the current throttle opening TVO and the turbine rotational speed Nt. The turbine rotational speed Nt is computed from the vehicle speed VSP (output shaft rpm) and the gear ratio $CG_{RATIO}$ for the current speed change step (for example speed 3).

In step 17, the current drive force F1 is computed based on the computed turbine torque Tt according to the following equation;

$$F1 = Tt \times CG_{RATIO} \times k$$

where $CG_{RATIO}$ is the gear ratio for the current speed change step (for example speed 3), and k is a constant determined for example by the turbine radius.

in step 18, the acceleration resistance Racc is computed according to the following equation;

$$Racc = \Delta VSP \times W \times K$$

where ΔVSP is the change in vehicle speed, W is the vehicle weight, and K is a constant.

In step 19, the running resistance Rrunis computed by subtracting the acceleration resistance Racc from the current drive force F1 according to the following equation;

$$Rrun = F1 - Racc$$

In step 20, the throttle opening TVO corresponding to the current vehicle speed VSP on the down-shift line from the next speed change step (for example speed 4) to the current speed change step (speed 3) in the down-shift line map is obtained, and this becomes $TVO_{DWN-NGP}$ (the down-shift throttle opening for the next speed change step) (the same as in FIG. 7).

In step 21, the map shown in FIG. 6 is referred to, and a turbine torque $Tt_{NGP}$ is computed based on the down-shift throttle opening $TVO_{DWN-NGP}$ for the next speed change step (speed 4) and the current turbine rotational speed Nt. This turbine torque $Tt_{NGP}$ is the maximum turbine torque at the next speed change step (speed 4).

In step 22, the maximum drive force F3 is computed for the next speed change step (speed 4) based on the computed turbine torque $Tt_{NGP}$ according to the following equation;

$$F3 = Tt_{NGP} \times NG_{RATIO} \times k$$

where $NG_{RATIO}$ is the gear ratio for the next speed change step (speed 4), and k is a constant determined for example by the turbine radius.

In step 23, the maps shown in FIGS. 8(A), (B), (C) and (D) are reffered to, and the threshold value S computed for the vehicle speed VSP and next speed change step.

In step 24, the sum of the maximum drive force F3 for the next speed change step (speed 4) and the threshold value S (F3+S) is compared with the running resistance Rrun.

When the compared result is F3+>Rrun, control proceeds to step 25 where an up-shift requirement signal is output, to thus effect up-shift.

now when instead of the forceful down-shift as mentioned before for step 14, the down-shift line is transferred to the high vehicle speed side or to the low throttle opening side, then after effecting up-shift in step 25, the down-shift line can be returned to the original position.

On the other hand, when F3+S≦Rrun, then since insufficient drive force is anticipated even with up-shift, then the routine is terminated without carrying out up-shift.

Due to this up-shift prevention control, then shift hunting with return to up-shift after a forceful down-shift can be prevented.

now with the present invention, when speed change is effected from a current speed change step to a speed change step on the lower speed side, then the speed change from the current speed change step to the next speed change step on the lower speed side preferably involves a speed change to a speed change step on the highest speed side of the speed change steps which can satisfy the drive force.

With the present invention as described above, when the drive force is insufficient at a current speed change step, for example due to ascending a slope, the sensation of an insufficient drive force is minimized due to a rapid down-shift, with the effect that vehicle drivability is improved. The invention thus has considerable industrial applicability.

I claim:

1. A control apparatus for an automatic transmission for controlling speed change by referring to a shift pattern map on the basis of vehicle speed and engine load to select a speed change step, comprising:

running resistance computing means for computing current running resistance;

maximum drive force computing means for computing the maximum drive force for a current speed change step based on at least the engine load corresponding to the current vehicle speed on a down-shift line in the shift pattern map from a current speed change step to a speed change step on a lower speed side;

comparison means for comparing said running resistance and said maximum drive force; and means for effecting speed change from a current speed change step to a speed change step on a lower speed side according to results of the comparison, when said maximum drive force is less than said running resistance.

2. The control apparatus for automatic transmission for according to claim 1, wherein:

said comparison means makes a comparison after first adding a predetermined threshold value to one of said maximum drive force and said running resistance.

3. The control apparatus for automatic transmission for according to claim 2, further comprising:

threshold value adjustment means for changing said threshold value in accordance with vehicle operating conditions.

4. The control apparatus for automatic transmission for according to claim 3, wherein:

the vehicle operating conditions for said threshold value adjustment means comprise a speed change step.

5. The control apparatus for automatic transmission for according to claim 3, wherein:

the vehicle operating conditions for said threshold value adjustment means comprise a speed change step.

6. The control apparatus for automatic transmission for according to claim 1, wherein:

said means for effecting speed change to a speed change step on a lower speed side comprises forceful down-shift means which forcefully speed changes from a current speed change step to speed change step on the lower speed side.

7. A control apparatus for an automatic transmission for controlling speed change by referring to a shift pattern map on the basis of vehicle speed and engine load to select a speed change step, comprising:

running resistance computing means for computing current running resistance;

maximum drive force computing means for computing the maximum drive force for a current speed change step and the engine load corresponding to the current vehicle speed on a down-shift line in the shift pattern map from a current speed change step to a speed change step on a lower speed side;

comparison means for comparing said running resistance and said maximum drive force, and means for effecting speed change from a current speed change step to a speed change step on a lower speed side according to results of the comparison, when said maximum drive force is less than said running resistance.

* * * * *